United States Patent
Aguilar

(10) Patent No.: US 9,982,631 B2
(45) Date of Patent: May 29, 2018

(54) METHOD AND THERMAL REACTOR FOR SINGLE-VALVE PROPULSION WITH MULTIPLE INJECTIONS AND COMBUSTIONS PER ROTATION CYCLE

(71) Applicant: Michel Aguilar, Castanet Tolosan (FR)

(72) Inventor: Michel Aguilar, Castanet Tolosan (FR)

( * ) Notice: Subject to any disclaimer, the term of this patent is extended or adjusted under 35 U.S.C. 154(b) by 673 days.

(21) Appl. No.: 14/405,763

(22) PCT Filed: Jun. 5, 2013

(86) PCT No.: PCT/EP2013/001643
§ 371 (c)(1),
(2) Date: Dec. 4, 2014

(87) PCT Pub. No.: WO2013/182301
PCT Pub. Date: Dec. 12, 2013

(65) Prior Publication Data
US 2015/0184615 A1    Jul. 2, 2015

(30) Foreign Application Priority Data

Jun. 7, 2012   (FR) ..................................... 12 55318

(51) Int. Cl.
*F02K 7/06* (2006.01)
*F02C 5/12* (2006.01)
*F02K 1/28* (2006.01)

(52) U.S. Cl.
CPC .................. *F02K 7/06* (2013.01); *F02C 5/12* (2013.01); *F02K 1/28* (2013.01); *Y02T 50/671* (2013.01)

(58) Field of Classification Search
CPC ..... F02K 7/02; F02K 7/06; F02K 1/28; F02C 5/12

USPC .......... 60/204, 247, 249, 39.38, 39.39, 39.4, 60/39.76, 39.79, 39.8, 39.81
See application file for complete search history.

(56) References Cited

U.S. PATENT DOCUMENTS

| 2,761,283 A | 9/1956 | Houle |
| 4,658,859 A | 4/1987 | Backe et al. |
| 8,925,296 B2* | 1/2015 | Aguilar ................... F01D 17/14 |
| | | 60/247 |

FOREIGN PATENT DOCUMENTS

| FR | 412478 A | 7/1910 |
| FR | 14261 E | 10/1911 |
| FR | 2829528 A1 | 3/2003 |

(Continued)

*Primary Examiner* — Phutthiwat Wongwian
*Assistant Examiner* — Loren Edwards
(74) *Attorney, Agent, or Firm* — IM IP Law; C. Andrew Im

(57) ABSTRACT

The injection speed of the injection valves in an internal combustion engine is increased by using a single injection valve configured to carry out multiple fuel injections and combustions per rotation cycle. The single-valve propulsion thermal reactor has a casing with upper and lower walls consecutively defining a sleeve for taking in a pressurized air flow, a combustion chamber, and a gas discharge nozzle. The thermal reactor has a single injection valve to inject fresh gas into the combustion chamber, and at least one valve to exhaust burnt gases, which extends about transverse axes. The valves are cylindrical and have multiple surfaces which have a circular cross-section and are separated by facets that define, by a rotation of the valves, the intake and discharge ports for the gases. Preferably, a thermal ignition tank is built into the combustion chamber.

19 Claims, 5 Drawing Sheets

(56) References Cited

FOREIGN PATENT DOCUMENTS

FR 2945316 A1 11/2010
WO 2010/086091 A1 8/2010

\* cited by examiner

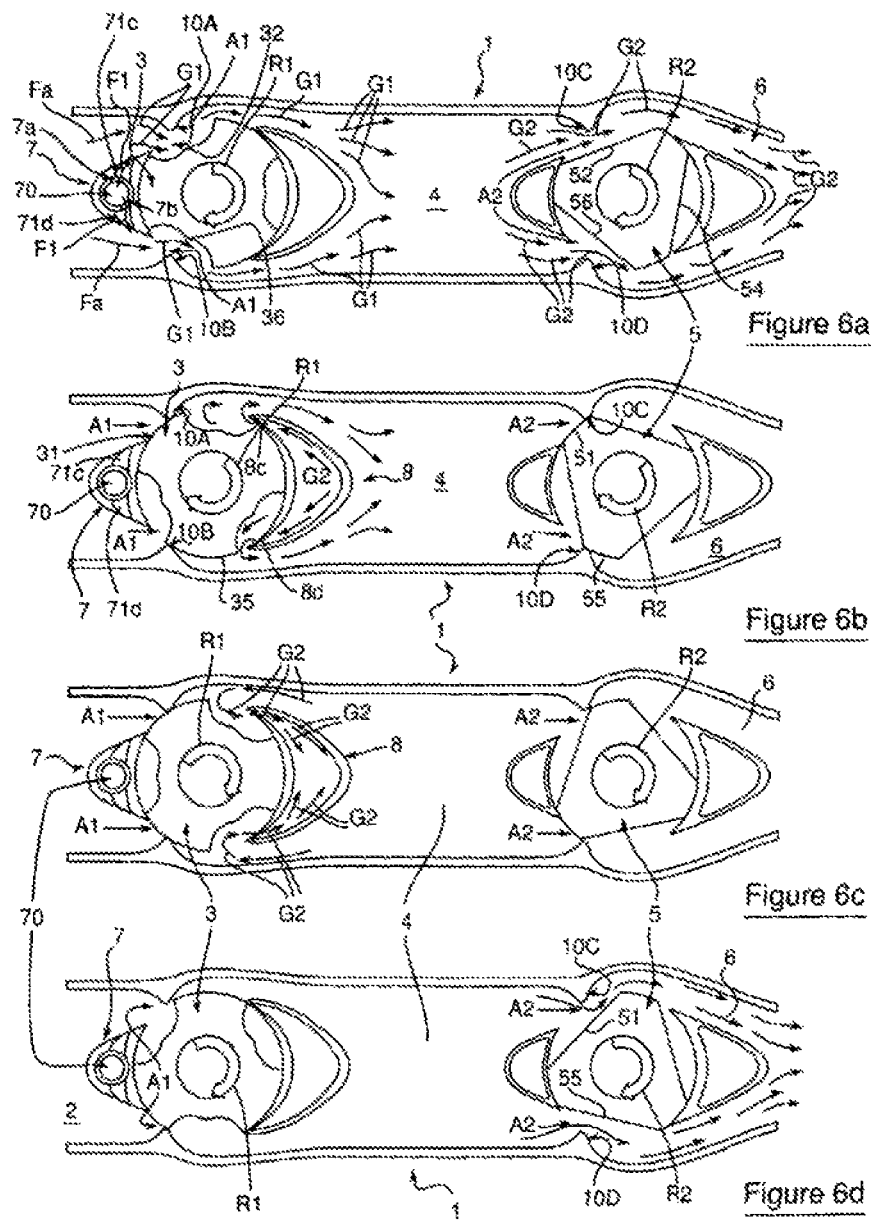

METHOD AND THERMAL REACTOR FOR SINGLE-VALVE PROPULSION WITH MULTIPLE INJECTIONS AND COMBUSTIONS PER ROTATION CYCLE

RELATED APPLICATIONS

This application is a § 371 application from PCT/EP2013/001643 filed Jun. 5, 2013, which claims priority from French Patent Application No. 12 55318 filed Jun. 7, 2012, each of which is herein incorporated by reference in its entirety.

TECHNICAL FIELD

The invention relates to a single-valve propulsion method with multiple injection and multiple combustions per rotation cycle, particularly in the jet engines used in the aeronautical field, and more particularly still, reactors operating on the Humphrey thermodynamic cycle using constant-volume combustion of a mixture of compressed air and of fuel. The invention also relates to an engine referred to as a thermoreactor operating on this method. In the present text, the qualifier "multiple" means "at least equal to three".

The invention may also apply to any type of internal combustion engine operating on a thermodynamic cycle of the pulsed type, for example motor vehicle engines, whether these operate at constant volume or at constant pressure in the combustion chamber.

The key benefit of the Humphrey cycle is that it makes more efficient use of the energy that the fuels can supply by performing combustion at constant volume followed by complete expansion of the burnt gases thus producing high levels of kinetic energy. Depending on the type of application, the reactor will produce power by driving a turbine, or alternatively will produce thrust directly. Reactors performing combustion at constant volume, also referred to as "thermoreactors", therefore offer decisive advantages over turbomachines operating on a constant-pressure combustion, notably in terms of compactness, allowing them to be housed in the wings of an aircraft—in terms of mass, thrust and thermodynamic efficiency (with fuel consumption savings in excess of 10%).

PRIOR ART

Combustion in thermoreactors is of the pulsed type whereas combustion in present-day constant-pressure turbomachines is continuous. Turbomachines with multiple thermoreactors are described in greater detail for example in patent document FR 2 945 316. In general, each thermoreactor comprises at least a compressor, at least a nozzle, and a combustion chamber connected to the compressor and to the nozzle by two sets of valves, injection and ejection valves respectively.

Each combustion cycle is conventionally made up of three phases: a phase of admitting or injecting a preformed mixture of compressed air and of fuel, a phase of actual combustion of this mixture of gas by controlled emission, and a phase of expansion with ejection of the burnt gases. The thermoreactors operate in parallel and each thermoreactor is phase-shifted so that during one and the same combustion cycle, the thermoreactors cover all of the phases of this cycle.

The rotation of the valves is driven by suitable electric motors in a synchronized manner so that when a premixture of fresh gas is introduced into the combustion chamber by a throat formed between two injection valves (admission phase), the two ejection valves close the gas outlet. Similarly, after the combustion of the mixture, the injection valves close the admission to the combustion chamber and the ejection valves form a throat for letting the gases out during the expansion of the burnt gases (ejection phase).

The valves have suitable cylindrical shapes of elongate or oblong external cross section and are positioned so that, as they rotate in a coordinated manner, they are able to form connecting throats which are successively opened and closed twice in each rotary cycle. In other words, each cyclic rotation of one set of valves covers two combustion cycles.

SUMMARY OF THE INVENTION

This type of thermoreactor is also a particular benefit if it could be miniaturized. Specifically, reducing the dimensions and therefore the volume of such thermoreactors leads to a reduction in their mass and bulk. As a result, applications to the field of space travel are conceivable, as are applications to other domains (scale models, experiments on new fuels, etc.).

However, a miniaturization ratio of the order of 5 to 10—making it possible for example to come down from a combustion chamber volume of one liter to 100 or 200 $cm^3$—leads to a corresponding decrease in the propulsion power supplied by the thermoreactor, all other things being equal. If the power is to be maintained, then the rate of injection of the valves needs to be significantly increased, leading to great problems with valve stability and sealing between these valves and the casing of the combustion chamber whereas the rate at which the post-combustion gases are ejected—which is dependent only on the pressure and temperature conditions—remains substantially constant. The invention seeks to alleviate these problems by providing the ability to use a single injection valve of special shape allowing several injections of fuel and combustions to be performed per rotation cycle of these valves.

More specifically, one subject of the present invention is a single-valve propulsion method with multiple injections and multiple combustions per rotation cycle, comprising, per combustion cycle, a phase of admitting premixed fresh gases as input into a combustion chamber, a phase of actually combusting these gases in the body of the combustion chamber, and a phase of discharging the burnt gases as output from this combustion chamber. In this method, at least three constant-volume combustion cycles are performed per complete rotation cycle of multiple shapings able to form access apertures for admitting the mixture of fresh gases into the combustion chamber for a determined duration. These injection shapings follow on from one another uniformly in each constant-volume combustion cycle by rotation about a single transverse axis. Each of these shapings injects substantially the same quantity of premixture of fresh gases into the combustion chamber, this quantity being determined by the geometry and rotational speed of the shapings so as to establish an optimal pressure in the combustion chamber. Such an optimum pressure maximizes turbomachine performance.

According to some preferred embodiments:
  at the end of each combustion cycle, a storage, preferably incorporated into the combustion chamber is effected by bleeding off high-pressure and high-temperature burnt gases and then, after new fresh gases from the next combustion cycle have been admitted, the high-pressure hot gases bled off from the previous combustion cycle mix with the low-pressure fresh gases by reinjection into the combustion chamber brought about by a pressure difference and triggering the ignition of the fresh gases;

the bleeding-off of burnt gases is carried out via the shapings during intervals of time in which these shapings face toward the inside of the combustion chamber;

the bleeding-off and reinjection of the bled-off gases are performed by two similar operations according to movement of the bled-off gases circulating in opposite directions;

the storage is common to at least two simultaneous bleed-off operations followed by two simultaneous reinjection operations in the combustion chamber;

an injection of fuel is incorporated into a stream of compressed air upstream of the combustion chamber to form the premixture of fresh gases introduced into the combustion chamber during the admission phase of each combustion cycle, the fuel being injected into the stream of air via rotating ports which open periodically and in a ducted manner into said stream in a manner synchronized with the duration of the admission phase;

during the phase of discharging the burnt gases of each combustion cycle which follows the actual combustion phase, one of the multiple ejection shapings form an access aperture for discharging the burnt gases from the combustion chamber, the ejection shapings following on uniformly from one another by rotation about at least one single transverse axis to form the discharge access apertures during the same duration as the duration for which the admission access apertures are formed by the injection shapings;

a cooling of the burnt gases is carried out by an exchange of heat as close as possible to the ejection shapings;

the rotation cycles of the fuel injection ports in the stream of air, of the injection shapings for injecting the premixture of fresh gases into the combustion chamber and of the discharge shapings for discharging the burnt gases are synchronized so that no fuel is injected into the stream of air nor is any access aperture providing admission to the combustion chamber formed during the combustion phase, and in which the phases of admitting and ejecting gases into and from the combustion chamber have a period of overlap during which the fresh gases entering the combustion chamber via the admission access apertures discharge the remaining burnt gases from the previous combustion cycle via the discharge access apertures.

The invention also relates to a thermoreactor able to implement the above method. Such a thermoreactor comprises a casing of parallelepipedal overall shape with an upper wall and a lower wall successively forming, from upstream to downstream, an inlet sleeve for a stream of compressed air, a combustion chamber and a gas discharge nozzle. This thermoreactor also comprises a single injection valve for injecting fresh gases into the combustion chamber and at least one ejection valve for ejecting the burnt gases extending about transverse axes for respectively separating the sleeve from the combustion chamber and separating the combustion chamber from the nozzle. The valves are cylindrical and have multiple faces of circular cross section uniformly distributed and separated by cut facets forming, by rotation of the valves, access apertures for admitting and discharging the gases of heights that can vary periodically between open to the maximum and fully closed when the valves are driven in synchronized rotation by drive means about the transverse axes.

According to some preferred embodiments:

an inbuilt thermal ignition tank extends transversely in the combustion chamber near the injection valve and is provided with ducts with transverse openings arranged in such a way as to allow gases to circulate from the tank to the combustion chamber and from the combustion chamber to the tank via the cut facets during earlier time intervals and completing the combustion of the fresh gases;

the valves have at least three and at most four cut facets and circular faces;

each cut facet forms a recess of concave overall shape having a groove bottom of a shape chosen between a flat face, a face with a single concave curvature, a face with a double curvature and a face with two concave curvatures connected by a convex curvature;

when the injection and ejection valves have three cut facets uniformly distributed between three circular faces, the axes of rotation of these valves are located in the combustion chamber and in the discharge nozzle;

the facets of the injection valve extend over a width substantially equal to that of the chords of the circular faces and the facets of the ejection valve extend over a width substantially greater than that of the chords of the circular faces;

a fuel injector is incorporated into the inlet sleeve for the stream of compressed air so as to form a premixture of fresh gases to be introduced into the combustion chamber during the admission phase of each combustion cycle, the injector comprising a transverse cylindrical injection body punctured by at least two transverse ports and a transverse outer partially enclosing the cylindrical injection body and forming at least two ducts opening via transverse slits into the sleeve; in such conditions, when the cylindrical injection body is given a rotational movement synchronized with the rotation of the injection valve for the duration of the admission phases, the fuel is periodically injected into the stream of air in order to form an air/fuel premixture of fresh gases in the sleeve when the rotating ports are in communication with the ducts and the access apertures providing admission to the combustion chamber are formed;

the fuel injector is located close to the injection valve so that the air/fuel premixture of fresh gases is formed as close as possible to the access apertures providing admission to the combustion chamber while at the same time remaining compatible with the time taken for the premixture to vaporize completely;

at least one cooling pipe for the burnt gases, in which pipe a heat-transfer fluid circulates, is located as close as possible to the ejection valve;

the cooling pipe or pipes is or are chosen from an upstream shield located in the combustion chamber, a pipe internal to the ejection valve and centered on the axis of rotation thereof and/or a downstream shield located in the gas discharge nozzle;

a control unit synchronizes the speeds at which the fuel injector and the admission and ejection valves are driven so that the injection of fuel into the sleeve is synchronized with the formation of the access apertures for admitting the fresh gases via the injection valve into the combustion chamber, said valves rotating at the same speed so that the admission and discharge access apertures close at the same time in order to achieve constant-volume combustion.

BRIEF DESCRIPTION OF THE FIGURES

Other features and advantages of the present invention will become apparent from reading detailed nonlimiting embodiments thereof, with reference to the attached figures which, respectively, depict:

FIGS. 6a to 6d: cross-sectional schematics of the embodiment of the thermoreactor according to FIG. 1 according to the various phases which follow on from one another during a combustion cycle: admission of fresh gases (FIG. 6a), ignition of these gases (FIG. 6b), end of combustion (FIG. 6c), then discharge of burnt gases (FIG. 6d).

DETAILED DESCRIPTION

In this text, the qualifiers "upstream" and "downstream" relate on the whole to the direction in which the gases travel between arriving and being discharged. The qualifiers "upper" and "lower" refer to the location of an element with respect to the median plane of the thermoreactor in its standard configuration of use, and "internal" refers to the location of an element oriented on the side of this median plane. The term "transverse" denotes, in the median plane, the direction normal to the longitudinal axis of the thermoreactor.

Figure 1:
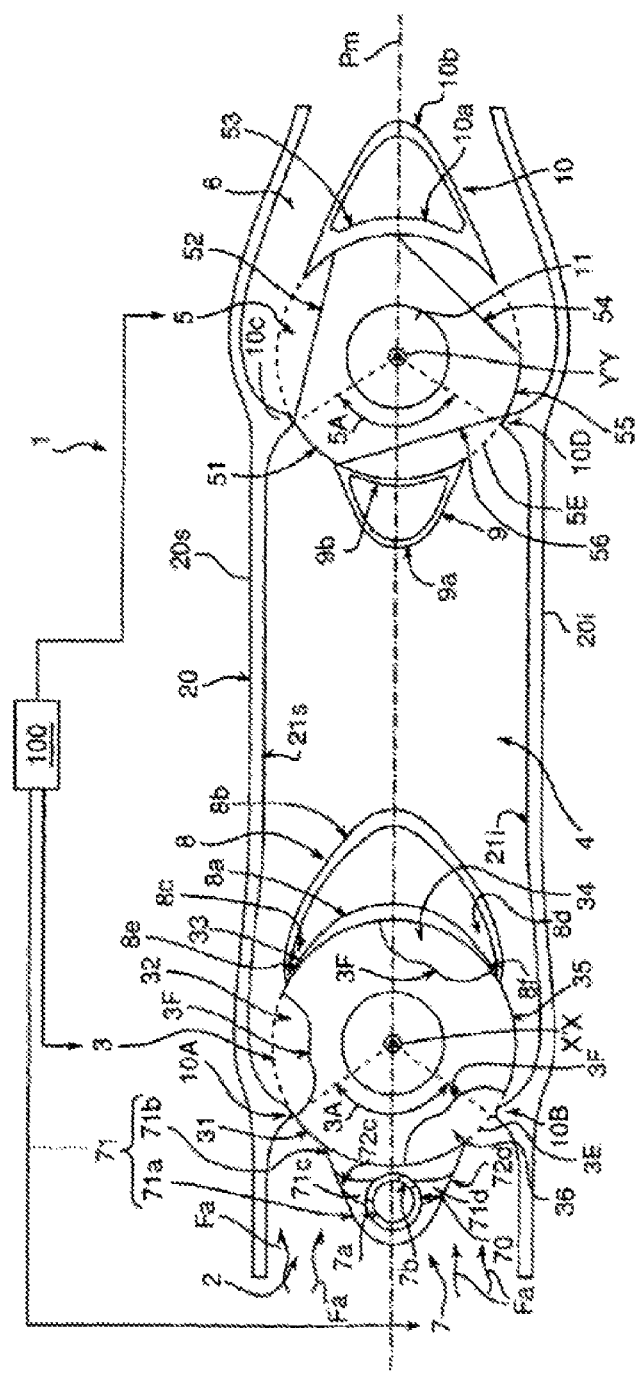
FIG. 1: a view in longitudinal section of one example of the thermoreactor according to the invention comprising an injection valve with three bucket-shaped recesses and an ejection valve with three straight cut facets.

With reference to the view in longitudinal section of FIG. 1, an example of a thermoreactor 1 according to the invention comprises a casing 20 of rectangular overall shape in cross section and parallelepipedal in extension in space, with an upper wall 20s and a lower wall 20i. As an alternative, the casing may have an elliptical contour in order to spread mechanical loads more evenly. Such a casing 20 has a median plane of symmetry Pm. This casing 20 forms, from upstream to downstream according to the direction in which the gases progress: an inlet sleeve 2 for a stream of compressed air Fa upstream from a compressor (not depicted), a combustion chamber for the fresh gases 4 and a discharge nozzle 6 for the burnt gases.

The air intake sleeve 2, the combustion chamber 4 and the discharge nozzle 6 are delimited by radial projections 10A to 10D situated facing one another in pairs substantially at right angles to the median plane Pm. In this way, the protrusions 10A and 10C on the one hand, and 10B and 10D on the other, are formed transversely and, respectively, on the internal faces 21s and 21i of the upper 20s and lower 20i walls of the casing 20 respectively. An injection valve 3 for injecting fresh gases into the combustion chamber 4 and an ejection valve 5 for ejecting burnt gases to the nozzle 6 extend transversely in order respectively to separate the sleeve 2 from the combustion chamber 4 and the combustion chamber 4 from the nozzle 6. The valves 3 and 5 are cylindrical, with a base that is circular overall, and extend transversely about axes of rotation X'X and Y'Y. These axes of rotation are located in the median plane Pm and, more particularly, respectively in the combustion chamber 4 and in the discharge nozzle 6. The opposing radial protrusions 10A-10B and 10C-10D thus periodically come into contact with the valves 3 and 5 in each combustion cycle, respectively subtending angles 3A and 5A substantially equal to 120°.

Three circular faces are uniformly distributed on the circumference of the valves 3 and 5, these mainly being the circular faces 31, 33 and 35 in the case of the injection valve 3, and the circular faces 51, 53 and 55 in the case of the ejection valve 5. These circular faces are separated, on a main part of their transverse extent, by cut-facet shapings forming recesses 32, 34 and 36 in the case of the injection valve 3, and planar faces 52, 54 and 56 in the case of the ejection valve 5. The presence of recesses in the injection valve 3 means that the extent to which the combustion chamber 4 is filled with premixture gases can be increased significantly by comparison with planar cut facets.

More particularly, the recesses 32, 34 and 36 of the injection valve 3 extend over a width substantially equal to that of the chords of the circular faces 31, 33 and 35 to encourage uniform admission of fresh gases to the combustion chamber 4. Further, the faces 52, 54 and 56 of the ejection valve 5 extend over a width substantially greater than that of the chords of the circular faces 51, 53 and 55 to encourage the discharging of gases to the nozzle 6.

In the example illustrated, the recesses 32, 34 and 36 of the injection valve 3 have a groove bottom 3F that is convex overall, with having two convex curvatures connected by a central concave curvature. This configuration encourages reliable routing of a given quantity of premixture into the combustion chamber 4. As explained hereinbelow (with reference to FIGS. 6a to 6d), these cut facets 32, 34, 36, 52, 54, 56 will thus form an inlet access aperture and an outlet access aperture respectively for admitting fresh gases and letting out burnt gases, by synchronous rotation of the X'X and Y'Y transverse axes of the valves 3 and 5.

The thermoreactor 1 is also equipped with a fuel injector 7, with an ignition tank 8 and with cooling pipes 9 to 11.

The fuel injector 7 is incorporated into the inlet sleeve 2 for the arrival of the stream of compressed air Fa, to form a premixture of fresh gases. This injector 7 comprises a transverse cylindrical injection body 70 punctured by two transverse ports 7a and 7b. A transverse outer 71 partially encloses the cylindrical body 70. This outer 71 is made up of a convex wall 71a and of a concave wall 71b, these walls facing upstream so that the concave wall 71b externally conforms to the shape of the circular envelope 3E (in dotted line) of the injection valve 3. The walls 71a and 71b between them form two ducts 71c and 71d which start on the injection body 70 and extend substantially radially on each side of the injection body 70 with respect to the median plane Pm.

At their start, the ducts 71c and 71d have a width substantially equal to the width of the ports 7a and 7b of the body 70 and open via transverse injection slits 72c and 72d in the sleeve 2. Advantageously, these fuel-injection slits are located near the injection valve 3 so that the air/fuel premixture forms as close as possible to the intake into the combustion chamber 4. The distance between the injector and the aperture providing access to the combustion chamber is determined so that the premixture will be able to vaporize completely.

As for the inbuilt thermal ignition tank 8, that also extends transversely near the injection valve 3 but in the combustion chamber 4. This tank 8 has two walls 8a and 8b having shapes that are convex-concave overall and face downstream. These walls 8a and 8b form ducts 8c and 8d which, at their end, have transverse openings 8e and 8f onto the chamber 4. These openings are located as close as possible to the injection valve 3 so as to encourage double circulation of the gases between the tank 8 and the combustion chamber 4 via the recesses 32, 34 and 36. These circulations occur during the intervals of time in which the recesses 32, 34 and 36 substantially face the transverse openings 8e and 8f of the tank 8 (see hereinafter with reference to FIGS. 5b and 5c which illustrate ignition and end of combustion of the gases of one combustion cycle).

Cooling pipes are provided where the hot gases originating from the combustion are discharged. Circulating through these cooling pipes, which are located as close as possible to the ejection valve 5, is a heat-transfer fluid which performs heat exchanges. One of these cooling pipes takes the form of an upstream shield 9, located in the combustion chamber 4. This shield 9 has a structure made up of two transverse walls 9a and 9b joined at their ends, with a respectively convex/concave curvature facing upstream. This being so, the concave wall 9b extends as close as possible to the circular envelope 5E (in dotted line) of the ejection valve 5.

Another shield 10, this one downstream of the ejection valve 5, is incorporated into the discharge nozzle 6. It too takes the form of two walls 10a and 10b with curvatures facing downstream, these respectively being concave and convex. The concave wall 10a extends as close as possible to the circular envelope 5E of the ejection valve 5.

Advantageously, the pipe 11 internal to the ejection valve 5 and centered on the axis of rotation Y'Y thereof also acts as a cooling pipe for the post-combustion gases through the circulation of a suitable heat-transfer fluid along this pipe 11.

A control unit 100 synchronizes the rotational speeds of the fuel injector 7 and of the injection 3 and ejection 5 valves so that the injection of fuel is brought about by the injection valve 3. The valves 3 and 5 are controlled by the unit 100 to have the same rotational speed so as to close off accesses to the combustion chamber 4 for a determined duration so that constant-volume combustion can take place for this duration.

Figure 2:
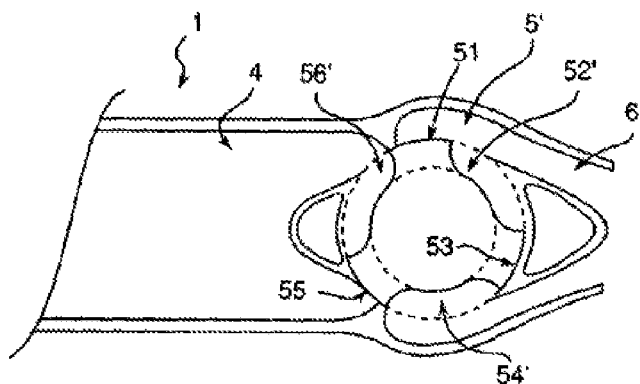
FIG. 2: a partial longitudinal section view of the example of the thermoreactor of FIG. 1, with an ejection valve which has three recesses.

An alternative form of ejection valve for the example thermoreactor 1 is illustrated by the view in part section of FIG. 2. In this view, an ejection valve 5' with recesses 52', 54' and 56' replaces the ejection valve of FIG. 1 with cut facets formed of planar faces 52, 54 and 56. The ejection valve 5' adopts the profile shape of the convex overall recesses 32, 34 and 36 of the injection valve 3 of FIG. 1. The recesses 52', 54' and 56' extend over a width substantially greater than that of the chords of the circular faces 51, 53 and 55, in the example illustrated being twice as wide. The presence of recesses makes it possible significantly to increase the extent to which the burnt gases are ejected from the combustion chamber 4 into the nozzle 6.

Figure 3A:
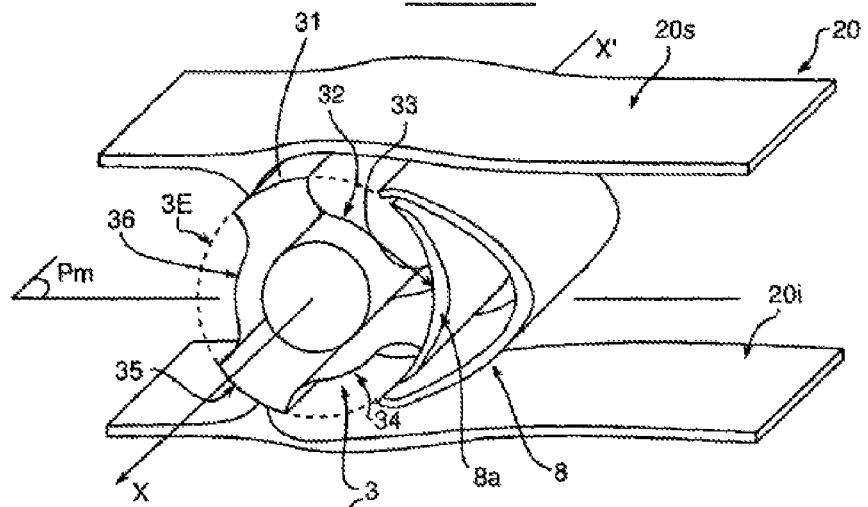
FIGS. 3a and 3b: perspective views of the injection valve in connection with the inbuilt ignition tank, of the injection valve and of the ejection valve taken out of their context.
Figure 3B:
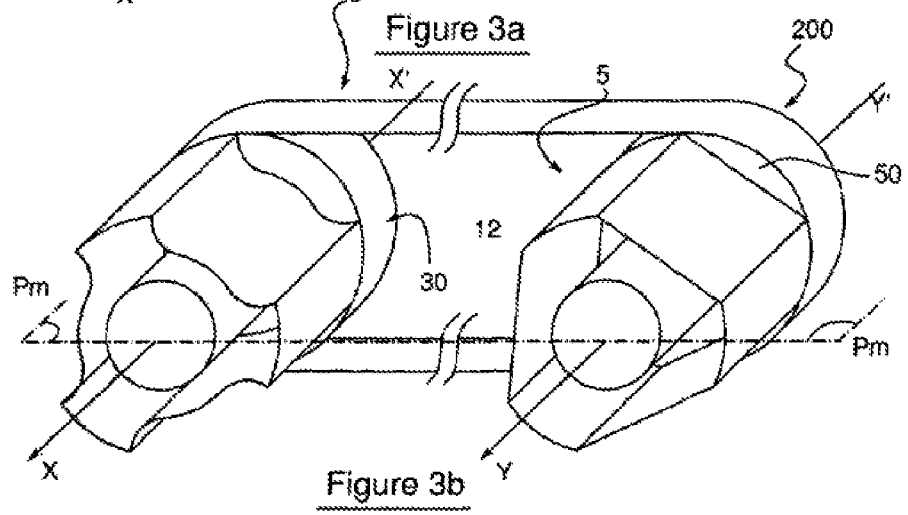

The perspective views of FIGS. 3a and 3b illustrate the transverse extensions of the injection 3 and ejection 5 valves parallel to the axes X'X and Y'Y in the median plane Pm—between the walls 20s and 20i of the casing 20—and that of the inbuilt ignition tank 8. It is particularly evident that the concave wall 8a of the tank 8 follows the external circular face 31 of the injection valve 3 and, therefore, over time, of all the circular faces 31, 33 and 35 of the valve 3 or, to put it another way, the circular envelope 3E of said valve 3. In addition, the recesses 32, 34 and 36 can be seen in perspective as forming buckets with a slightly domed bottom.

FIG. 3b more specifically shows, at the end of the valves 3 and 5, drive pullers 30 and 50 which accept a belt 12 able to ensure that the two valves 3 and 5 are synchronized. The injection valve 3 is rotationally driven by a geartrain connected with the shaft of an electric motor (not depicted). The assembly comprising pulleys—belt—geartrain constitutes drive means 200 controlled by the unit 100.

Figure 4:
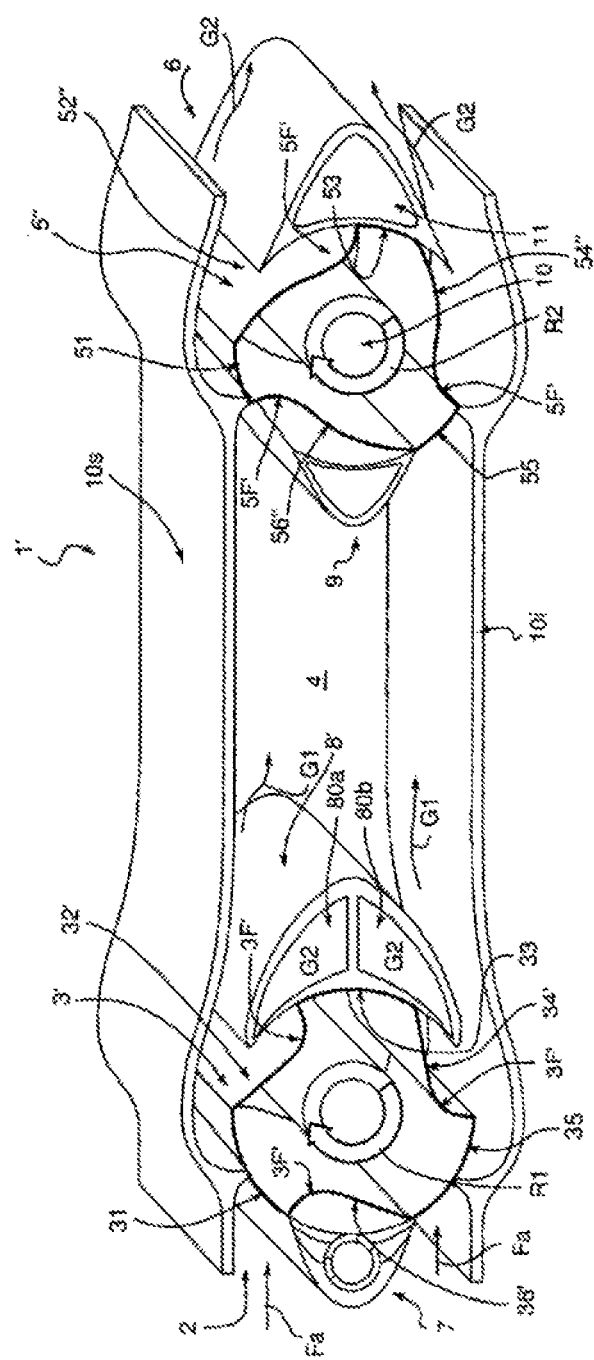
FIG. 4: a perspective view of the embodiment of the thermoreactor according to FIG. 1 equipped with injection and ejection valves that have asymmetric recesses.

Reference is made to FIG. 4 which illustrates a perspective view of the example of thermoreactor according to FIGS. 1 and 2 with, as an alternative, injection 3' and ejection 5'' valves which respectively have recesses 32', 34', 36' and 52'', 54'' and 56'' of asymmetric shape.

The thermoreactor 1' of FIG. 4 is the one depicted in FIGS. 1 and 2 with the same casing 20 of walls 20s and 20i, the same injector 7 and the same cooling pipes 9 to 11. The parts of sleeve 2 for the flow of air Fa, combustion chamber 4 for the fresh gases G1 and nozzle 6 for discharging the burnt gases G2 are also substantially identical. The thermoreactor differs therefrom via the thermal ignition tank 8' which has two compartments 80a and 80b separated symmetrically by a partition 81 parallel to the median plane Pm. Such partitioning allows more uniform distribution of the hot gases G2 that are to be stored.

It also differs therefrom through the configuration of the recesses 32', 34', 36' and 52'', 54'' and 56'' of the injection 3' and ejection 5'' valves, which are in the form of buckets the curvature of which is concave overall. More specifically, the recesses 32', 34' and 36' of the injection valve 3' are just concave, and the recesses 52'', 54'' and 56'' of the ejection valve 5'' have an alternating convex/concave curvature. In other embodiments, the recesses of the injection valve have a double curvature and those of the ejection valve have just a concave curvature.

In contrast with what has been depicted in FIGS. 1 and 2, the buckets no longer have a plane of symmetry: the groove bottoms 3F' and 5F' are offset toward the circular faces 33, 35, 31, 53, 55 and 51 which follow the respective recesses 32', 34', 36', 52'', 54'' and 56'' in the direction of rotation of the valves 3' and 5'' (in the direction of the arrows R1 and R2). This being so, the recuperation of fresh gases G1 by the injection valve 3' and of burnt gases G2 by the ejection valve is optimized by the dynamics of the rotation of the valves.

Figure 5:
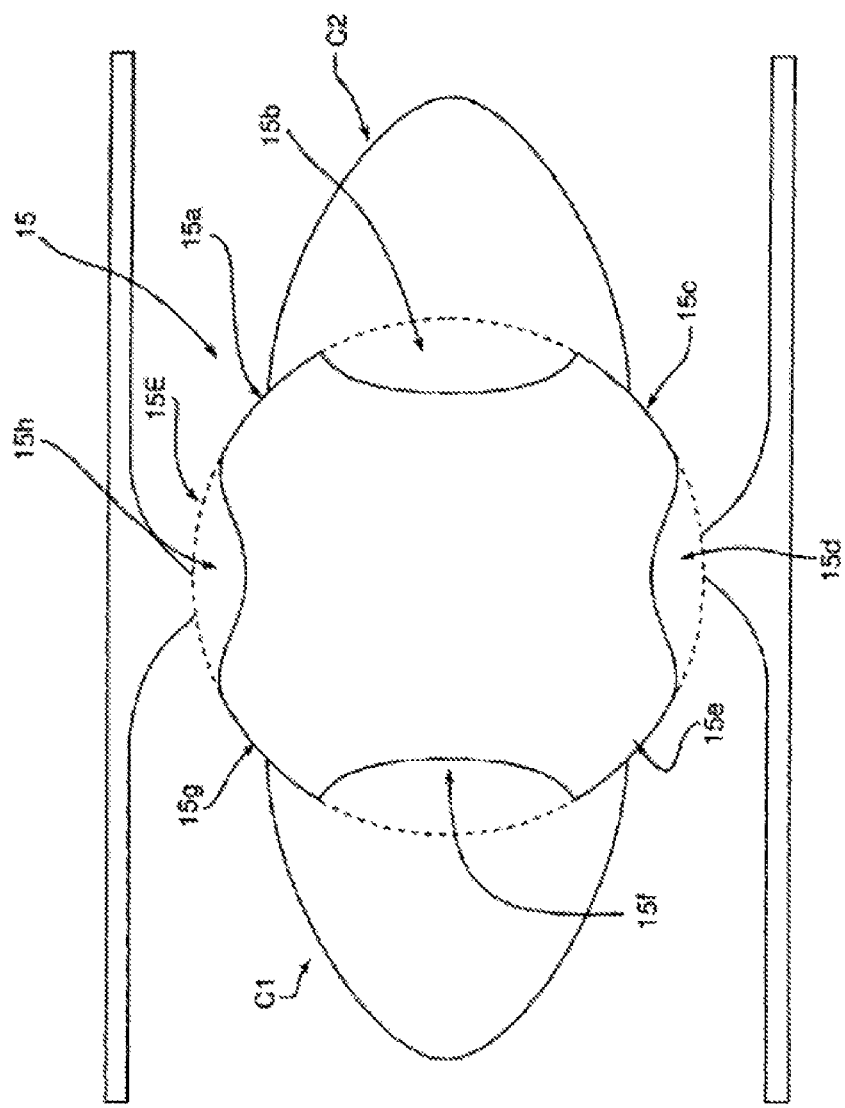
FIG. 5: a view in section of one example of an injection or ejection valve with four recesses.

According to another embodiment, the view in cross section of FIG. 5 illustrates an alternative valve 15 which may be an injection or ejection valve, with four circular faces 15a, 15c, 15e and 15g distributed between four cut facets 15b, 15d, 15f and 15h. The cut facets take the form of convex recesses. Containers C1 and C2 located upstream and downstream of the valve 15 conform to the shape of the circular envelope 15E (in dotted line) of the valve 15. These containers with concave/convex curvature respectively represent a fuel injector and an inbuilt ignition tank, in the event that the valve 15 is an injection valve. These containers C1 and C2 represent cooling pipes when the valve 15 is used as an ejection valve.

In order to describe a complete combustion cycle, the cross-sectional diagrams of FIGS. 6a to 6d illustrate, in the example of thermoreactor 1 according to FIG. 1, the successive phases of injecting fuel with the admission of premixed fresh gases (FIG. 6a), of igniting these gases to generate the start of combustion thereof (FIG. 6b), the end of combustion with the storage of hot gases (FIG. 6c), and the discharging of the burnt gases (FIG. 6d). The diagrams are photographs fixing the instants during the various phases mentioned, which phases follow on periodically from one another with the synchronous rotation (arrows R1 and R2) of the injection and ejection valves 3 and 5 and of the cylindrical injection body 70 of the injector 7.

With reference to FIG. 6a, the ports 7a and 7b of the injection body 70 in synchronous rotation with the injection valve 3, come into communication with the ducts 71c and 71d of the injector 7. The fuel from the center of the injection body 70 then passes through the ports 7a and 7b to flow into the ducts 71c and 71d. An air-fuel premixture of fresh gases G1 is formed by the injection of fuel (arrows F1) into the compressed air inlet sleeve 2 (arrows Fa). To do that, the fuel leaves the ducts 71c and 71d via the slits 72c and 72d (FIG. 1) to mix with the air in fine droplets. In this phase, the valves 3 and 5 are in the position for accessing the combustion chamber 4, so as to allow the premixture G1 to be admitted and the burnt gases G2 to be exhausted.

The premixture G1 enters the combustion chamber 4 via access apertures A1 formed between the ends of the radial dividing walls 10A and 10B and the recesses 32 and 36 of the injection valve 3. The fresh gases G1 drive out the remaining burnt gases G2 from the previous combustion cycle. The remaining burnt gases G2 are thus discharged from the combustion chamber 4 from apertures A2 for accessing the nozzle 6, which remain formed between the ends of the radial dividing walls 10C and 10D and the cut facets 52 and 56 of the ejection valve 5. The radial heights of the access apertures A1 and A2 vary during the admission of the fresh gases G1 and the discharging of the burnt gases G2 between wide open and fully closed during the admission (FIG. 6a) and discharge (FIGS. 6a and 6d) phases.

The rotating of the valves 3 and 5 will then isolate the combustion chamber 4 from the air sleeve 2 and the nozzle 6 (FIG. 6b). For that, two circular faces of these valves 31, 35 and 51, 55, respectively, are then in contact with the ends of the radial protrusions 10A, 10B in the case of the injection valve 3, and 10C, 10D in the case of the ejection valve 5. At the same time, the body 70 of the injector 7 driven in synchronous rotation closes off the ducts 71c and 71d: the injection of fuel is cut off. The access apertures A1 and A2 are closed.

Some of the burnt gases G2 which are hot and at a raised pressure, stored in the ignition tank 8 during the previous combustion cycle, then leave the tank 8 via the ducts 8c and 8d in order to ignite the fresh gases G1: upon contact with these hot gases G2, the fresh gases G1 ignite and combustion in the body of the combustion chamber 4 begins.

During the combustion phase proper, the valves 3 and 5—still rotating synchronously—continue to isolate the combustion chamber 4 so that combustion takes place at constant volume (the access apertures A1 and A2 remain closed). At the end of combustion (FIG. 6c), some of the burnt gases G2 fill the ignition tank 8 because of the reduced pressure prevailing in that tank by comparison with the pressure of the rest of the combustion chamber 4.

With reference to FIG. 6d, the faces 51 and 55 of the ejection valve 5 are some distance from the end of the respective walls 10C and 10D and the apertures A2 providing access from the combustion chamber 4 to the nozzle 6 are open. The ejection valve 5 thus allows the burnt gases G2 to be discharged toward the nozzle 6. The injection valve 3 just begins to open the access apertures A1 between the sleeve 2 and the combustion chamber 4. New fresh gases G1, after an air/fuel premixture has been formed, will then be injected when the injection body 70 and the injection valve 3 have continued to turn according to the process explained hereinabove with reference to FIG. 6a.

The combustion cycle in FIGS. 6a to 6d repeats three times per complete rotation cycle of each cut facet 32, 34 and 36 of the injection valve 3 or 52, 54 and 56 of the ejection valve 5, or alternatively per rotation cycle of the fuel injection body 70. Throughout the duration that the access apertures A1 are formed in each combustion cycle, the same quantity of premixture of fresh gases G1 is introduced into the combustion chamber 4, this quantity being predetermined according to the geometry and rotational speed of the valves so that the combustion chamber is filled under pressure conditions suited to ensuring full combustion of the gases.

The invention is not restricted to the embodiments described and illustrated. It is, for example, possible to conceive of incorporating the thermal igniter into the combustion chambers of any type of heat engine. In addition, the fuel injector may also be designed to feed any type of heat engine. Furthermore, the design whereby the various compartments of the casing are separated is not limited to radial protrusions: this separation may be achieved by protrusions formed on the valves or by the valves themselves. Furthermore, the cut facets of the valves may be variable in width and the recesses formed may have any type of profile fit for the function.

It is also possible to install the thermal ignition tank outside of the combustion chamber, for example by providing a tank—chamber connecting pipe. Moreover, it is possible to fit more than one ejection valve, for example two ejection valves with parallel axes in one and the same plane perpendicular to the median plane, operating in contrarotation.

The invention claimed is:

1. A single-valve propulsion thermo-reactor, comprising:
a casing of parallelepipedal shape with an upper wall and a lower wall successively forming, from an upstream to a downstream, an inlet sleeve for a stream of compressed air;
a combustion chamber;
a gas discharge nozzle;
a single injection valve to inject fresh gases into the combustion chamber for separating the inlet sleeve from the combustion chamber;
at least one ejection valve to discharge burnt gases extending about transverse axes for separating the combustion chamber from the gas discharge nozzle;
a fuel injector incorporated into the inlet sleeve for the stream of compressed air to form a pre-mixture of fresh gases to be introduced into the combustion chamber during an admission phase of each combustion cycle, the fuel injector comprises a transverse outer partially enclosing the cylindrical injection body and forming at least two ducts opening into the inlet sleeve via a transverse slit;
wherein the injection and ejection valves are cylindrical and have multiple faces of circular cross section uniformly distributed and separated by facets forming, by rotation of the injection and ejection valves, access apertures to admit and discharge the gases, openings of the access apertures varying periodically between fully opened and fully closed as the injection and ejection valves are driven in synchronized rotation by a gear train about the transverse axis;
wherein a rotational movement of the transverse cylindrical injection body is synchronized with a rotation of the injection valve during the admission phase of each combustion cycle; and
wherein fuel is periodically injected into the stream of compressed air to form an air/fuel pre-mixture of fresh gases in the inlet sleeve when the rotating injection fuel ports are in communication with the ducts and the access apertures providing admission to the combustion chamber are formed.

2. The single-valve propulsion thermo-reactor as claimed in claim 1, further comprising an inbuilt thermal ignition tank extending transversely in the combustion chamber near the injection valve and comprising ducts with transverse openings arranged to allow the burnt gases to circulate from the inbuilt thermal ignition tank to the combustion chamber and from the combustion chamber to the inbuilt thermal ignition tank through the facets of the injection and ejection valves.

3. The single-valve propulsion thermo-reactor as claimed in claim 1, wherein each of the injection and ejection valves have three to four facets and three to four circular faces.

4. The single-valve propulsion thermo-reactor as claimed in claim 3, wherein the injection and ejection valves have three facets uniformly distributed between three circular faces, the transverse axes of rotation of the injection and ejection valves are respectively located in the combustion chamber and in the gas discharge nozzle.

5. The single-valve propulsion thermo-reactor as claimed in claim 1, wherein each facet forms a recess of concave shape having a groove bottom of a shape of one of the following: a flat face, a face with a single concave curvature, a face with a double curvature or a face with two concave curvatures connected by a convex curvature.

6. The single-valve propulsion thermo-reactor as claimed in claim 1, wherein the facets of the injection valve extend over a width of chords of the circular faces; and wherein the facets of the ejection valve extend over a width greater than that of the chords of the circular faces.

7. The single-valve propulsion thermo-reactor as claimed in claim 1, wherein the fuel injector is located near the injection valve so that the air/fuel pre-mixture of fresh gases is formed near the access apertures providing admission to the combustion chamber while providing time for the air/fuel pre-mixture of fresh gases to vaporize completely.

8. The single-valve propulsion thermo-reactor as claimed in claim 1, further comprising at least one cooling pipe with a heat-transfer fluid circulating therein to cool the burnt gases, the cooling pipe being located near the ejection valve.

9. The single-valve propulsion thermo-reactor as claimed in claim 8, wherein the cooling pipe is at least one of the following: an upstream shield located in the combustion chamber, a pipe internal to the ejection valve and centered on an axis of rotation thereof, and a downstream shield located in the gas discharge nozzle.

10. The single-valve propulsion thermo-reactor as claimed in claim 1, further comprising a control unit to synchronize speeds at which a fuel injector, the injection valve and the ejection valve are driven so that fuel injected into the inlet sleeve is synchronized with the formation of the access apertures for admitting the fresh gases into the combustion chamber through the injection valve; and wherein the injection and ejection valves rotate at a same speed so that access apertures for admitting and discharging gases close at a same time to provide constant-volume combustion.

11. A single-valve propulsion method with multiple injections and multiple combustions per rotation cycle using a single-valve propulsion thermos-reactor as claimed in claim 1, comprising the steps of:
in each combustion cycle, admitting a pre-mixture of fresh gases into the combustion chamber, combusting the pre-mixture of fresh gases in a body of the combustion chamber, and discharging burnt gases from the combustion chamber;
performing at least three constant-volume combustion cycles per a complete rotation cycle of a plurality of injection facets forming admission access apertures to admit the pre-mixture of fresh gases into the combustion chamber for a predetermined duration, the injection facets follow on from one another uniformly in each constant-volume combustion cycle by rotation about a single transverse axis; and
injecting substantially a same quantity of the pre-mixture of fresh gases into the combustion chamber by each of the injection facets, the quantity of the pre-mixture of fresh gases being optimized for a geometry and a rotational speed of the injection facets to establish an optimal pressure in the combustion chamber.

12. The propulsion method as claimed in claim 11, further comprising, at the end of each constant-volume combustion cycle, the steps of:
bleeding-off high-pressure burnt gases into a storage incorporated into the combustion chamber;
admitting new low-pressure fresh gases for a next combustion cycle; and
re-injecting the high pressure burnt gases bled off from a previous combustion cycle into the combustion chamber to mix with low-pressure fresh gases, the reinjection of the high-pressure burnt gases brought about by a pressure difference and triggering an ignition of the low-pressure fresh gases.

13. The propulsion method as claimed in claim 12, further comprising the step of bleeding off the high-pressure burnt gases through the injection facets during intervals of time in which the injection facets face toward inside of the combustion chamber.

14. The propulsion method as claimed in claim 12, further comprising the step of performing the steps of bleeding-off high-pressure burnt gases and reinjection of high-pressure burnt gases by two similar operations with bled-off burnt gases circulating in opposite directions.

15. The propulsion method as claimed in claim 12, wherein the storage is common to at least two simultaneous bleeding-off high-pressure burnt gases steps followed by two simultaneous re-injecting of the high-pressure burnt gases steps in the combustion chamber.

16. The propulsion method as claimed in claim 11, further comprising the steps of incorporating an injection of fuel into a stream of compressed air upstream of the combustion chamber to form the pre-mixture of fresh gases introduced into the combustion chamber during the admitting a pre-mixture of fresh gases step of each combustion cycle, the fuel being injected into the stream of compressed air through rotating injection fuel ports which open periodically and in a ducted manner into the stream of compressed air synchronized with a duration of the admitting a pre-mixture of fresh gases step of each combustion cycle.

17. The propulsion method as claimed in claim 16, further comprising the step of synchronizing rotation cycles of the rotating injection fuel injection ports in the stream of compressed air, the injection facets for injecting the pre-mixture of fresh gases into the combustion chamber and discharge facets for discharging the burnt gases so that no fuel is injected into the stream of compressed air nor is any admission access aperture providing admission to the combustion chamber during the combustion phase; and wherein the steps of admitting a pre-mixture of fresh gases and discharging burnt gases into and from the combustion chamber have a period of overlap during which the fresh gases entering the combustion chamber through the admission access apertures discharge remaining burnt gases from a previous combustion cycle through discharge access apertures.

18. The propulsion method as claimed in claim 11, further comprising the step of forming a discharge access aperture by one of a plurality of ejection facets to discharge the burnt gases from the combustion chamber during the step of discharging burnt gases in said each combustion cycle, the ejection facets follow on uniformly from one another by rotation about a second single transverse axis to form discharge access apertures for a same duration as a duration for which the admission access apertures are formed by the injection facets.

19. The propulsion method as claimed in claim 11, further comprising the step of cooling the burnt gases by an exchange of heat in proximity of a plurality of ejection facets.

* * * * *